Patented Apr. 12, 1938

2,114,256

UNITED STATES PATENT OFFICE 2,114,256

SULPHURIC ACID DERIVATIVES OF HIGHER MOLECULAR ORGANIC AMINES

Otto Schenck, Dessau, Anhalt, Germany, assignor to Deutsche Hydrierwerke Aktiengesellschaft, Berlin-Charlottenburg, Germany, a corporation of Germany No Drawing. Application August 18, 1934, Serial No. 740,435. In Germany August 19, 1933

3 Claims. (Cl. 260—99.12)

This invention relates to the preparation of sulphuric acid derivatives of higher molecular organic amines having detergent, wetting, foaming and dispersing properties making them excellently suitable in the textile, paper and leather industries.

An object of the invention is to produce compounds having the above mentioned properties to a highly developed degree but which also are suitable for use at cold or only slightly elevated temperatures.

A great number of compounds has already been suggested for employment in the textile, paper, leather and other industries in connection with the manufacture of washing, wetting, foaming and dispersion agents for both liquid and solid substances, as well as for many other technical purposes, which are derived from the ordinary soap-forming fats and fatty acids or which are derived from the corresponding hydrocarbon radical, as, for example, the sulphuric acid esters of higher molecular fatty alcohols or the true sulphonic acid derivatives of aliphatic long-chained hydrocarbons or their salts.

Compounds of the kind above described, contrary to ordinary soaps, possess the advantage of a greater stability toward calcium and magnesium salts contained in hard water and also a greater wetting and foaming capacity. However, for many purposes they fail to possess a sufficiently high solubility, as for instance is desirable in connection with the treatment of textiles in cold or only moderately warm baths.

In accordance with the present invention it has been discovered that commercially very valuable products of high wetting, foaming and dispersion power can be obtained, if higher molecular glycols are converted into mineral acid esters in the usual manner such as with hydrochloric acid or sulphuric acid, and these are condensed successively, in either order, on the one hand with ammonia, primary and secondary or cyclic secondary amines, and on the other hand, if desired treated with a sulphurizing means. The glycols may be only half esterified and then condensed with the ammonia or amine compound into amino alcohols and then esterified at the free hydroxyl group with a mineral acid, whereupon, if desired, a further treatment with a sulphurizing means may be effected. As an additional step the intermediate or final product obtained by the condensation of the mineral acid esters with the ammonia or primary amine, can be treated with an acylating agent such as acetyl chloride, benzoic chloride, lauroic chloride by which treatment the basic character of the amino group may be removed which procedure may lead to products of technical value in many instances.

Compounds constituting the invented products may for example, be obtained in the following manner: The higher molecular glycols, which, for example, may be produced by the reduction of higher molecular aliphatic, aromatic or cycloaliphatic hydroxycarboxylic, ketocarboxylic or dicarboxylic acids, are reacted with a hydrohalogen acid into corresponding dihalogenides, and these compounds are then condensed with ammonia or the amines which replaces one of the halogen atoms, whereupon the remaining halogen atom is replaced by the sulphonic acid group by treatment with a salt of sulphurous acid such as sodium sulphite. The halogen amines can alternatively be treated with an alkali polysulphide and in the usual way the obtainable intermediate product oxidized into sulphonic acids.

A further embodiment of the present method is, for example, effected by converting the glycol to a halogen hydrine which is then transformed into a free or N-substituted amino alcohol by a treatment with ammonia or the primary or secondary amine or with a heterocyclic base, like piperidine and dekahydrochinolin etc., the product obtained by means of sulphonation being converted into water soluble reagents for which purpose all technically usable sulphonation agents, like concentrated sulphuric acid, chlorosulphonic acid, etc., may serve, temperatures of from —10 to plus 50° or slightly above usually being satisfactory. The products obtainable according to the aforementioned method possess a soap-like character and can be adopted for all purposes for which soaps or soap substitutes have been used up to the present time.

For use in strong acid baths, the true sulphonic acids are particularly suitable and they may be produced according to the method first described, and may also be formed by the conversion of the sulphuric acid esters of the amino alcohols, obtainable according to the second method if treated with sulphites or polysulphides followed by oxidation. For the preparation of these true sulphonic acids one may, naturally, also start with the halogen amines obtainable by esterifying the amino alcohols with hydrohalogen.

*Example 1*

1,6-hexandiol as may be produced by the catalytic reduction of esters of adipic acid, is introduced into a 5 to 6-fold quantity of a 20% hydrochloric acid solution and the mixture heated to 70 to 80° while stirring for about five hours. Then the chlorhydrine formed is separated from the aqueous lower layer and is heated with 1½-fold quantity of diethylamine for about one to two hours in an autoclave at a temperature of about 100–120° C. The reaction mixture obtained is rendered alkaline with soda lye, the excess of diethylamine is distilled off, and the substituted amino alcohol extracted from the alkaline liquid with any organic solvent. The substituted amino alcohol remaining after distilling off the organic solvent, is now introduced into a 5 to 6-fold quantity of sulphuric acid monohydrate at a temperature initially of 0-5°. When the temperature rises to 25 to 30° the alcohol is converted into a water soluble sulphuric acid ester which in the usual manner may be neutralized with an inorganic base, such as an alkali metal hydroxide or with any organic base to form a water soluble salt.

In the above process the hexandiol may be replaced by ricinoleyl alcohol obtainable by the reduction of castor oil according to the method of Bouveault and Blanc, and be converted into the corresponding amino compound and the desired sulphuric acid derivative.

Example 2

The bromhydrin of 1,10-decandiol is treated with a sulphonating means according to the method described in Example 1. The corresponding sulphuric acid ester is thereby obtained, which, by treatment with equimolecular quantities of sodium disulphide at the temperature of a water bath and by exchange of sulphur for one of the bromine atoms yields the corresponding disulphide. This intermediate product by the method described in Example 1 is converted with 150% of the quantity of butyl amine (1½-fold) into the sulphide of the butylated decylamine at a temperature 150 to 180°. The latter, if necessary after the butylation has taken place is then oxidized with aqueous nitric acid in the presence of vanadium pentoxide into a butyl-amino-decyl-sulphonic acid.

Example 3

One mol. 1,8-octandiol as may be produced by the catalytic reduction of esters of suberic acids, is converted into the ω-hydroxyoctyl sulphuric acid ester. The sodium salt of this compound is converted under pressure at a temperature of about 150° with piperidine into the ω-piperidino-octyl-alcohol. This substituted alcohol is esterified according to Example 1 with sulphuric acid and the product resulting from the esterification is neutralized. The sodium salt of the ω-piperidino-octyl-sulphuric acid ester will be obtained, distinguished by a good water-solubility and soap-like properties. The resulting finished product may be treated as well in well-known manner with sulphurizing means and converted into the corresponding ω-piperidino-octyl-sulphonic acid, which also shows certain properties of capillar activity.

The products of the present invention have the property of greatly lowering the surface tension of aqueous solutions and because of this property they may be utilized for many different technical processes, such as the treatment for processing and improvement of textile materials namely; cleaning vegetable and animal fibres, particularly when removing fatty or oily materials, carbonization, as an addition when the sizing material is removed from the textile, in impregnating, bleaching, mordanting, as an addition to soap in an acid bath, in mercerizing lye treating solutions, to improve the absorption capacities of fibrous materials, in lustering and delustering processes, in degumming, kier-boiling, scouring, stripping, felting, and oiling or lubricating of yarns, as well as, weighting or loading of textile fibres.

These materials are also of particular value in dyeing in neutral, acid or alkaline baths, for reserving cotton in acid baths, in dyeing with developed or diazotized dyes, in dyeing animal fibres with vat dyes, in dyeing cellulose acetate fibres with insoluble dyes, and in dyeing or printing with aniline black.

They may be used for making pastes of dyes or dye components, for the production of azo, basic, acid, vat, or sulphur dyes in a finely divided condition, and for the production of finely divided inorganic pigments. They are useful for the conversion of solid substances normally insoluble in water, such as hydrocarbons, higher alcohols and other oxygen containing compounds, fats, oils, waxes, resins, pitches and pitchy substances into clear solutions or emulsions or dispersions, as cleansing agents particularly in hard water and where a fatty or oily film resists the usual cleansing media, in softening the baths for hides and skins and in froth flotation processes for the separation of mineral constituents.

The higher molecular glycols suitable for use in the practice of the present invention are particularly the alkylene glycols containing 6 or more carbon atoms in the molecule, preferably containing from 6 to 18 carbon atoms.

The nitrogen containing compounds suitable include ammonia, primary and secondary amines containing one or more alkyl or aryl radicals, preferably the lower alkyl radicals of from one to five carbons. Secondary amines where the nitrogen atoms are in the ring are also suitable. The invention, however, broadly covers all amine compounds as well as ammonia. The compounds are herein referred to broadly as "ammonia compounds", for the sake of convenience.

The term "sulphurizing means" has been employed for the purpose of including in general all true sulphonating as well as sulphating agents disclosed herein which may be accomplished in a single step as by using concentrated sulphuric acid, chlorosulphonic acid and salts of sulphurous acid or in a series of steps as by employing alkali polysulphides and oxidizing by the usual methods to produce true sulphonic acids.

Products of similar characteristics can be obtained by forming the pyro- or ortho-phosphate or the borate esters of the halogenated amines.

It should be understood that the invention is not limited to the specific examples given either as to the materials used or as to the exact procedure disclosed, but that it includes all variations coming within the whole tenor of the description and within the scope of the appended claims.

I claim:

1. The process of producing sulphuric acid derivatives of organic amines having a higher molecular radical comprising reacting a higher molecular glycol with a mineral acid to form an ester and thereafter reacting the ester with an ammonia compound and with a sulphonating means.

2. The process of producing sulphuric acid derivatives of higher molecular alkyl amines comprising replacing one OH radical of a higher molecular alkyl glycol with an inorganic acid radical, reacting the resulting ester with an ammonia compound to produce an amino alcohol and sulphonating said amino alcohol.

3. The process as described in claim 1 wherein the amino group is acylated.

OTTO SCHENCK.